United States Patent [19]

Fischer

[11] 4,444,993

[45] Apr. 24, 1984

[54] PARTICLE TRAP TO SHEATH NON-BINDING CONTACT FOR A GAS-INSULATED TRANSMISSION LINE HAVING A CORRUGATED OUTER CONDUCTOR

[75] Inventor: William H. Fischer, Pittsburgh, Pa.

[73] Assignee: The United States of America as represented by the United States Department of Energy, Washington, D.C.

[21] Appl. No.: 439,245

[22] Filed: Nov. 4, 1982

[51] Int. Cl.³ .................... H01B 9/06; H01B 9/04; H02G 5/02
[52] U.S. Cl. .................................. 174/14 R; 174/28
[58] Field of Search ............... 174/14 R, 16 B, 27, 174/28, 99 R, 99 B, 99 E; 138/108, 112, 113, 114; 339/1 R, 6 R, 6 RL, 9 R, 9 E

[56] References Cited

U.S. PATENT DOCUMENTS 4,328,391 5/1982 Cookson .................. 174/14 R
4,335,267 6/1982 Hopkins .................. 174/14 R Primary Examiner—Laramie E. Askin
Attorney, Agent, or Firm—M. J. Moran

[57] ABSTRACT

A non-binding particle trap to outer sheath contact for use in gas insulated transmission lines having a corrugated outer conductor. The non-binding feature of the contact according to the teachings of the invention is accomplished by having a lever arm rotatably attached to a particle trap by a pivot support axis disposed parallel to the direction of travel of the inner conductor/insulator/particle trap assembly.

3 Claims, 12 Drawing Figures

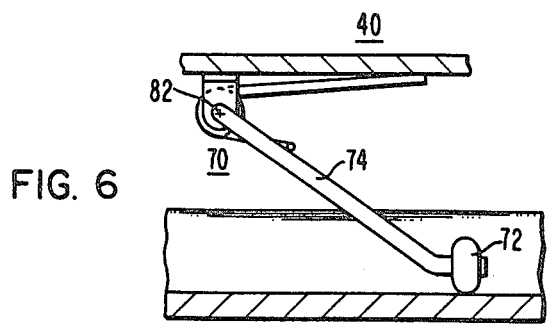
FIG. 6
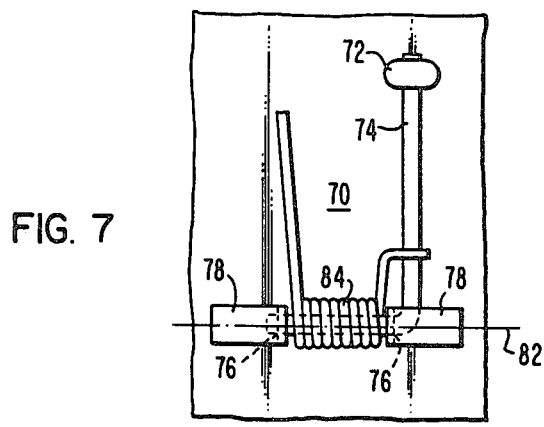
FIG. 7
FIG. 8
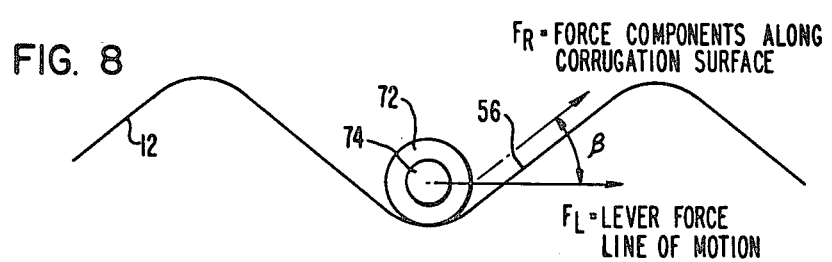

PARTICLE TRAP TO SHEATH NON-BINDING CONTACT FOR A GAS-INSULATED TRANSMISSION LINE HAVING A CORRUGATED OUTER CONDUCTOR

GOVERNMENT CONTRACT

The Government has rights in this invention pursuant to Contract No. ET-78-C01-2870 awarded by the U.S. Department of Energy.

CROSS-REFERENCE TO RELATED APPLICATIONS

This application is related to concurrently filed copending applications "Particle Trap To Sheath Contact For A Gas-Insulated Transmission Line Having A Corrugated Outer Conductor", Ser. No. 439,246, by W. H. Fischer, K. H. Yoon and A. H. Cookson; "Conductor Load Bearing Roller For A Gas-Insulated Transmission Line Having A Corrugated Outer Conductor", Ser. No. 439,247, by W. H. Fischer and K. H. Yoon; and "Non-Binding Conductor Load Bearing Roller For A Gas-Insulated Transmission Line Having A Corrugated Outer Conductor", Ser. No. 439,248, by W. H. Fischer; all assigned to the same assignee as the present invention.

BACKGROUND OF THE INVENTION

1. Field of the Invention:

The invention relates in general to gas-insulated transmission lines and in particular to a gas-insulated transmission line having a corrugated outer conductor and a particle trap to sheath movable contact.

2. Description of the Prior Art:

Compressed gas-insulated transmission lines typically comprise a hollow, cylindrical outer sheath, an inner conductor disposed within, but spaced apart from, the outer sheath, a plurality of insulating spacers which support the conductor in the sheath, and a compressed gas such as sulphur hexafluoride or the like in the sheath to electrically insulate the conductor from the sheath or outer conductor.

One problem occurring in the use of gas-insulated transmission lines concerns the mobile conducting or semiconducting particle. These particles can cause problems in that they may lower the dielectric strength of the insulating gas and may initiate flashover and breakdown of the gas as they travel between the outer sheath and the inner conductor. Trump, in U.S. Pat. No. 3,515,939, discloses the means for deactivating and eliminating the deleterious effects of such conducting particles. In that patent, there is described the use of electrodes placed within the outer sheath to create low field regions which trap and deactivate the particles. The low field regions are created by keeping the particle trap electrode at the same potential as that of the outer sheath or outer conductor by means of a particle trap to sheath contact.

A recent development proposes to use corrugated aluminum for the outer conductor instead of the smooth aluminum cylindrical outer sheath. With such a corrugated outer conductor, a standard particle trap to sheath contact is not suitable to keep the particle trap in contact with the corrugated outer conductor and thereby at the same electrical potential because of the large variation between the inside diameter of the sheath and the outside diameter of the particle trap assembly due to the peaks and valleys of the sheath corrugations. A good reliable electrical connection between the particle trapping means and the outer corrugated conductor is disclosed in concurrently filed copending U.S. patent application Ser. No. 439,246, entitled "Particle Trap To Sheath Contact For A Gas-Insulated Transmission Line Having A Corrugated Outer Conductor" by W. H. Fischer, K. H. Yoon and A. H. Cookson and assigned to the same assignee as the present invention. While the electrical conductor contact means disclosed in this patent application provides a contact suitable for corrugated outer conductors having moderate slopes to the corrugations, it is possible that the contact means will bind up upon insertion of the insulator/particle trap/inner conductor assembly into a corrugated outer conductor having steep slopes to the corrugations. The present application discloses a contact means providing the same excellent electrical contact having the additional desirable feature of not binding for any slope of the corrugations less than vertical.

SUMMARY OF THE INVENTION

Briefly, the present invention is a transmission line including an elongated corrugated outer tubular conductor, an elongated inner conductor disposed within the outer conductor, support insulators and an insulating gas which electrically insulates the inner conductor from the outer conductor, particle trapping means disposed proximate the inner periphery of said corrugated outer conductor for trapping foreign particles within the transmission line, and a non-binding contact means for keeping electrical continuity between the corrugated outer conductor and the particle trap regardless of the axial position of the particle trap relative to the corrugations of the outer corrugated conductor. The non-binding contact means of the invention moves along the outer conductor corrugations of any slope less than vertical without binding. The non-binding contact means of the present invention includes an electrical contact disposed on a lever arm which in turn is biased and rotatably disposed on the outer periphery of the particle trapping means so as to maintain electrical continuity between the particle trapping means and the outer corrugated conductor, regardless of the axial position of the particle trap within the corrugated outer conductor. The non-binding feature of the contact means is accomplished by having the lever arm rotatably attached to the particle trapping means by a pivot support axis disposed parallel to the direction of travel of the inner conductor/insulator/particle trap assembly. The contact means of the invention is applicable to gas insulated transmission lines having non-corrugated-elongated cylindrical outer conductors as well as gas insulated transmission lines having the corrugated outer conductors.

BRIEF DESCRIPTION OF THE DRAWINGS

The invention may be understood and further advantages and uses thereof more readily appreciated when considered in view of the following detailed description of the exemplary embodiments, taken with the accompanying drawings, in which:

FIG. 6 is an end view of the non-binding contact means of FIG. 5;

FIG. 7 is a top view of the non-binding contact means of FIGS. 5 and 6;

FIG. 8 is a schematic end view of the roller of the non-binding contact means of the FIGS. 5, 6 and 7, showing the lever force component diagram;

DESCRIPTION OF THE PREFERRED EMBODIMENT

Figure 1:
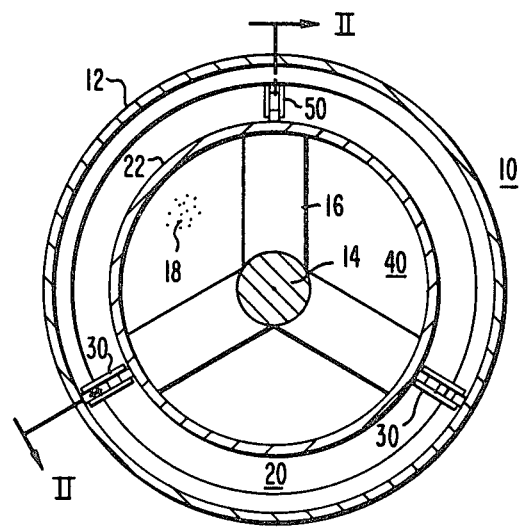
FIG. 1 is a cross-sectional view of a gas-insulated transmission line.
Figure 2:
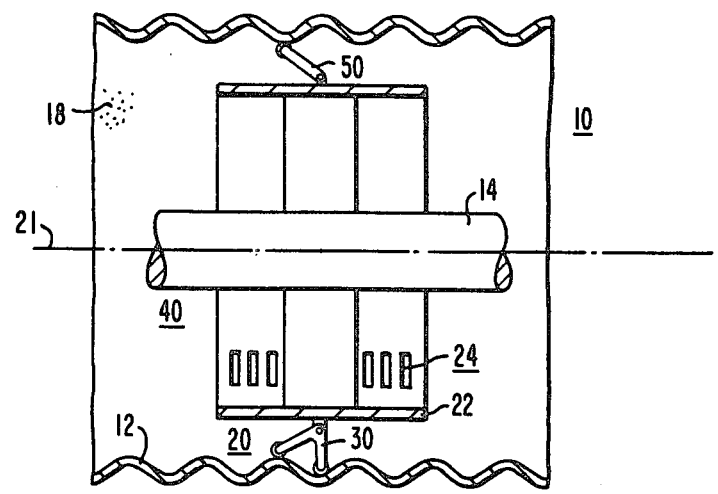
FIG. 2 is a longitudinal cross-sectional view taken along the lines II—II of FIG. 1.

Referring now to the drawings and to FIGS. 1 and 2 in particular, there is shown both vertical and longitudinal cross-sectional views, respectively, of a gas-insulated transmission line 10 having a corrugated outer conductor. Gas insulated transmission line 10 includes an elongated, corrugated cylindrical outer sheath or outer conductor 12, and an elongated inner conductor 14 disposed within, and spaced apart from, the corrugated outer conductor 12. The outer sheath or outer conductor 12 will typically be at low or ground electrical potential, whereas the inner conductor 14 will be at high electrical potential with respect to the outer sheath 12, and may typically carry voltages in the range 138–1200 kV. Insulatably supporting the inner conductor 14 within the outer sheath or outer conductor 12 are a plurality of supporting insulators 16, and electrically insulating the inner conductor 14 from the outer conductor 12 is an insulating gas 18, typical of which is sulphur hexafluoride at pressures of approximately 50 lbs/sq. in. gauge. Support insulator 16 is illustrated as a tripost design, although the invention may be utilized with alternate support insulators, such as for example disk or conically shaped, as will be more fully appreciated later. Providing low field regions 20 adjacent to the insulating spacers 16 are particle trapping rings 22 having apertures 24 to facilitate entry of particles into the low field regions 20. Particle trap 22 is illustrated of the ring design having apertures 24 to facilitate entry of particles into the low field regions 20; however, the particle traps may take any configuration so long as they are proximate and have electrical continuity with outer corrugated sheath 12. The inner conductor 14, the outer conductor or outer sheath 12 and the particle trapping rings 22 will typically be of good electrically conducting material such as aluminum.

Since particle trap rings 22 or other particle trap configurations disposed along outer corrugated conductor 12 of gas-insulated transmission line 10 must be kept at the same electrical potential as outer corrugated sheath 12, contact means for keeping electrical continuity between corrugated outer conductor 12 and particle trap 22 is necessary regardless of the axial position of the particle trap along the corrugated outer conductor. During assembly of the transmission line, as well as during expansion or contraction of the inner and outer conductors, movement of the inner conductor/insulator/particle trapping means assembly 40 within a corrugated outer conductor poses significant problems for electrical continuity, as well as for non-binding movement of the electrical contact which the contact means of the present invention overcomes.

Referring again now to FIGS. 1 and 2, there is shown at the top of particle trap 22 contact means 50 constructed according to the teachings of copending concurrently filed patent application Ser. No. 439,246, entitled "Particle Trap To Sheath Contact For A Gas-Insulated Transmission Line Having A Corrugated Outer Conductor", by W. H. Fischer, K. H. Yoon and A. H. Cookson, assigned to the same assignee as the present invention, for keeping electrical continuity between the corrugated outer conductor 12 and particle trap 22 regardless of the axial position of the particle trap relative to the corrugations of the corrugated outer conductor 12. Also shown in FIGS. 1 and 2 proximate the lower ends of the tripost insulator 16 and thereby separated by approximately 120°, there is shown generally at 30 transport means for supporting and providing movement of the inner conductor/insulator/particle trap means assembly axially along the corrugated outer conductor without radial displacement as more fully described in concurrently filed copending application Ser. Nos. 439,247 and 439,248 entitled "Conductor Load Bearing Roller For A Gas-Insulated Transmission Line Having A Corrugated Outer Conductor", by W. H. Fischer and K. H. Yoon, and "Non-Binding Conductor Load Bearing Roller For A Gas-Insulated Transmission Line Having A Corrugated Outer Conductor", by W. H. Fischer, respectively, both assigned to the same assignee as the present invention.

As mentioned earlier, although contact means 50 according to the teachings of concurrently filed copending patent application Ser. No. 439,246, entitled "Particle Trap To Sheath Contact For A Gas-Insulated Transmission Line Having A Corrugated Outer Conductor", by W. H. Fischer, K. H. Yoon and A. H. Cookson is a good reliable electrical connection between the particle trapping means and the outer corrugated conductor, it is possible that the contact means will bind up upon insertion of the insulator/particle trap/inner conductor assembly into a corrugated outer conductor having steep slopes to the corrugations. This is shown by referring to the lever force component diagram applied to a side view of contact means 50 in FIG. 3.

Figure 3:
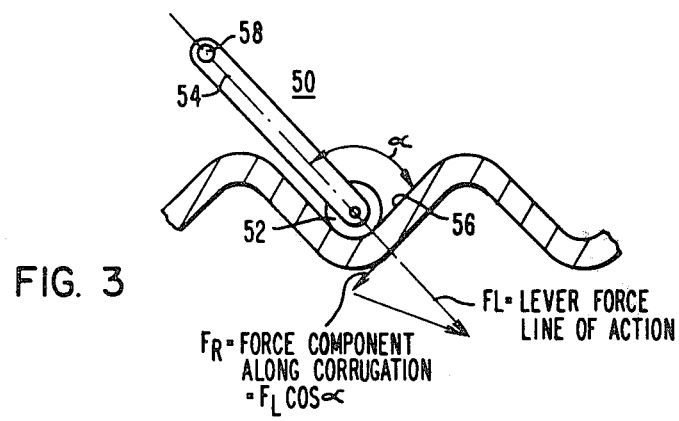
FIG. 3 is an enlarged side view of the particle trap to outer sheath contact means of said U.S. patent application Ser. No. 439,246, entitled "Particle Trap To Sheath Contact For A Gas-Insulated Transmission Line Having A Corrugated Outer Conductor" by W. H. Fischer, K. H. Yoon and A. H. Cookson, showing a lever force component diagram.

Referring now to FIG. 3 there is shown at line $F_L$ the lever force line of action for any force applied to roller 52 by means of lever 54 of contact means 50. From this it is readily apparent that the force component along the corrugation surface 56 of outer conductor 12 denoted by symbol $F_R$ is downward or negative when $\alpha$, the angle between lever arm 54 and corrugation surface 56 is less than 90°, and zero when $\alpha$ is 90° which follows because $F_R$, the force component along the corrugation surface 56 is equal to $F_L$, the lever force line of action times the cosine of $\alpha$, the angle between lever arm 54 and corrugation surface 56. Please note that contact means 50 shown in FIG. 3 is illustrated above corrugated sheath or corrugated outer conductor 12 for purposes of illustration only since it facilitates taking a top view as in FIG. 4, which illustrates a top view of contact means 50 and outer corrugated sheath or outer corrugated conductor 12. However, it is to be understood that contact means 50 as well as the non-binding contact means of the present invention may be disposed in the opposite direction as denoted in FIGS. 1 and 2 or at any position along the periphery of the particle trap. It is also to be understood that both contact means 50 and the non-binding contact means of the present invention are applicable to gas insulated transmission lines having non-corrugated, cylindrical or tubular elongated outer conductors.

Figure 4:
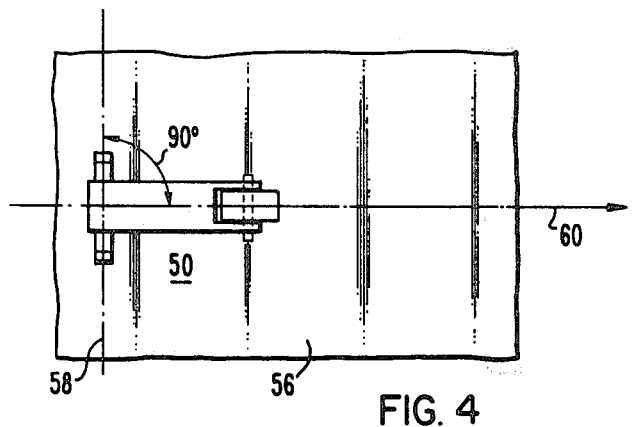
FIG. 4 is a top view of the contact means of FIG. 3.

Referring now to FIG. 4 there is shown a top view of contact means 50 of FIG. 3 showing the reason that $F_L$, the lever force line of action of FIG. 3, takes the direction shown in FIG. 3 because the pivot pin axis 58 of contact means 50 as shown in FIG. 4 is disposed perpendicular to the roller motion or the line of motion 60 of the inner conductor/insulator/particle trap assembly 40 of gas-insulated transmission line 10.

Figure 5:
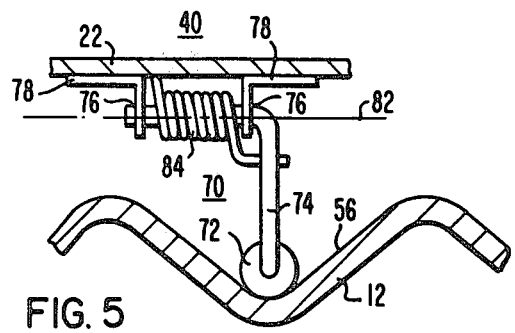
FIG. 5 is a side view of a non-binding particle trap to outer sheath contact means constructed according to the teachings of the invention.

Referring now to FIGS. 5, 6 and 7 there are shown a side view, end view and top view respectively of non-binding contact means 70 constructed according to the teachings of the invention. Non-binding contact means 70 will follow the rise and fall of the corrugations of outer conductor 12 so as to compensate for the large variations between the inside diameter of the outer sheath 12 and the outside diameter of particle trap 22 in gas-insulated transmission line 10, shown in FIGS. 1 and 2 according to the teachings of the invention. In addition, non-binding contact means 70 will not bind on any corrugated outer conductor, no matter how steep the slopes of the corrugations less than vertical. Non-binding contact means 70 includes electrical contact 72 which may be for instance a skid, contact button or, as in the preferred embodiment, a metal roller disposed at one end of "L"-shaped pivot lever 74 which in turn is rotatably disposed on the periphery of particle trap 22 by means of bearings 76 disposed in supports 78 along pivot axis 82, which pivot axis 82 is disposed parallel to the direction of travel of the inner conductor/insulator/particle trap assembly 40 or in line with roller 72 motion or axis 21 of gas-insulated transmission line 10 (FIGS. 1 and 2). Pivot lever 74 is biased by torsion spring 84 in a direction to maintain the required contact force between roller 72 and outer conductor or outer sheath 12. Reference to FIGS. 5, 6 and 7 shows that non-binding contact means assembly 70 ensures a firm electrical contact will be maintained with outer corrugated sheath 12 regardless of the axial position of inner conductor/insulator/particle trap assembly 40 because non-binding contact means assembly 70 will follow the rise and fall of the corrugations of outer conductor 12 so as to compensate for the large variations between the inside diameter of the outer corrugated sheath 12 and the outside diameter of particle trap 22. The advantage of using a metal roller for electrical contact 72 as in the preferred embodiment is that the electrical contact roller will not produce as many particles as a sliding contact would when the inner conductor/insulator/particle trap assembly is moved in an axial direction within the outer conductor or outer sheath 12 during insertion of the inner conductor/particle trap/insulator assembly into the outer corrugated sheath during initial manufacturing assembly of the gas-insulated transmission line 10 and also during extraction of the inner conductor/particle trap/insulator assembly from the outer sheath for maintenance purposes and also permits relative motion between the particle trap and outer sheath to allow for differences in thermal expansion and contraction of these two elements.

Figure 9:
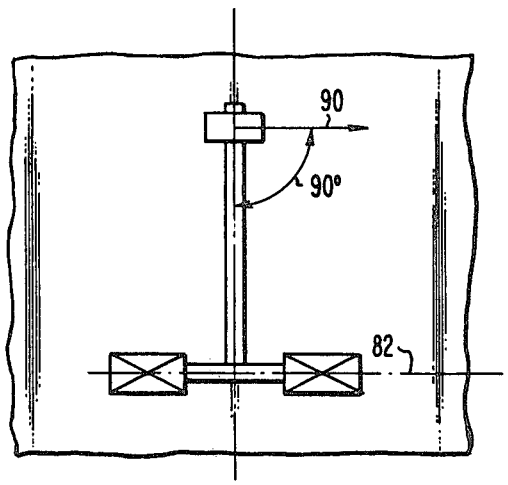
FIG. 9 is a schematic top view of the non-binding contact means constructed according to the teachings of the invention.

Referring now to FIGS. 8 and 9 there are shown schematic views of rollers 72 and a top view of non-binding contact means assembly 70 that illustrates that not only does non-binding contact means 70 meet all of the requirements of the electrical connection of contact means 50, but in addition is capable of use with any type of corrugated sheath of any slope less than vertical without binding. The key design element which makes it non-binding with any type of configuration or slope of corrugation less than vertical is that the pivot lever axis 82 is in line with the roller 72 line of motion which is also the line of motion of the inner conductor/particle trap/insulator assembly 40. The lever force component diagram of FIG. 8 shows that $F_R$, the force component along the corrugation surface 56, is in the upward or positive direction since $F_R$ is equal to $F_L$, the lever force times the cosine of $\beta$, the angle between the lever force line of motion and the slope of corrugation surface 56 because once again $F_R$ is equal to $F_L$ times the cosine of $\beta$.

Figure 10:
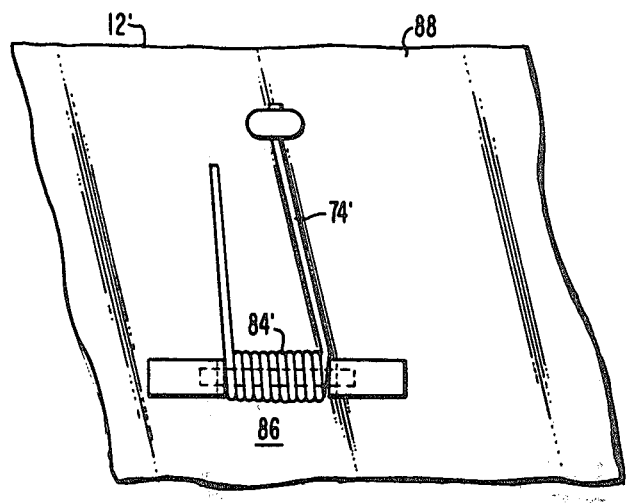
FIG. 10 is a top view of an alternate embodiment of the non-binding contact means of the invention as applied to a helical corrugated outer conductor or outer sheath.

Referring now to FIG. 10 there is shown another embodiment of non-binding contact means assembly 70 wherein this time pivot lever 74' is an extension of torsion spring 84' such that pivot lever 74' and torsion spring 84' are combined into one component, combined torsion spring and lever 86. Please note that the pivot lever portion 74' is bent to be in line with the helical type of corrugations 88 of outer conductor or sheath 12'. This is done to improve the clearance between the pivot lever 74' and the corrugation surface 88.

Figure 11:
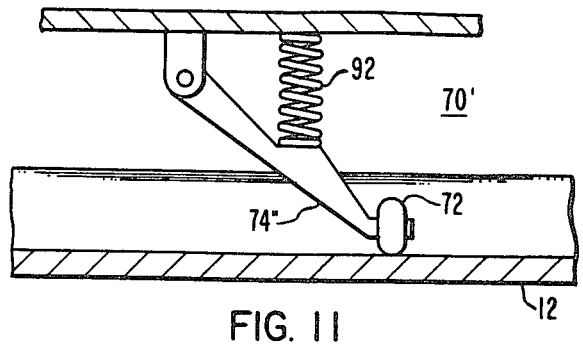
FIG. 11 is another embodiment of the non-binding contact means constructed according to the teachings of the invention.

Referring now to FIG. 11, there is shown another embodiment of the non-binding contact means assembly 70' constructed according to the teachings of the invention. In this embodiment helical spring 92 is used instead of the torsion spring to bias pivot lever 74" in a direction to maintain the required contact force between metal roller 72 and outer conductor or sheath 12.

Figure 12:
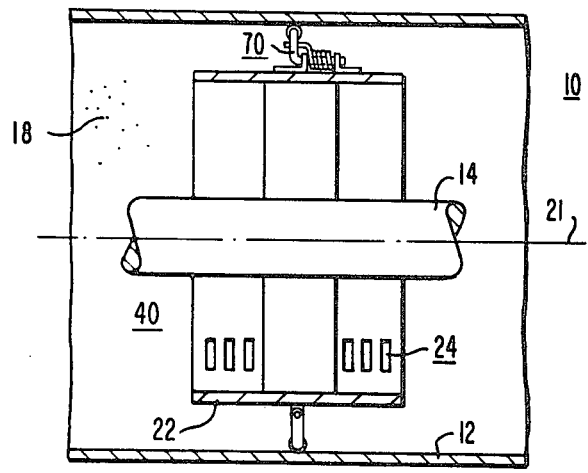
FIG. 12 is a cross-sectional view of a gas insulated transmission line having a non-corrugated outer conductor constructed according to the teachings of the invention.

In conclusion, the operation of the particle trap requires that a firm, reliable electrical connection be made between the metal particle trap and the outer metal sheath. The electrical connection must permit relative motion between the particle trap and the outer corrugated sheath to allow for differences in thermal expansion and contraction of these two elements. Typically, this would be in the order of 0.5 inch. The connection must also lend itself to insertion of the inner-conductor assembly into the sheath during initial manufacturing assembly of the gas-insulated transmission line unit and also extraction of the inner-conductor assembly from the outer sheath for maintenance purposes. Another very important requirement is that it must generate minimal metal particles during initial assembly or after the gas-insulated transmission line unit has been put into service. What has been disclosed is a unique, very simple, low cost particle trap to sheath non-binding contact means which meets all of the previously mentioned requirements for the electrical connection and in addition is capable of use with any type of corrugated sheath having any slope to the corrugations other than vertical. As illustrated in FIG. 12, the particle trap to sheath non-binding contact means 70 according to the teachings of the invention is suitable for gas insulated transmission lines having non-corrugated-elongated outer conductors as well.

I claim:

1. A gas-insulated transmission line, comprising:
   (A) a corrugated outer conductor;
   (B) an inner conductor adapted for connection to an energizing source and disposed interiorly in said outer conductor;
   (C) an insulating gas disposed within the annular space between said outer and inner conductors;
   (D) insulating means disposed between said outer and inner conductors for insulatingly supporting said inner conductor within said outer conductor;
   (E) particle trapping means disposed proximate the inner periphery of said corrugated outer conductor for trapping particles, said particle trapping means having the capability of moving relative to said corrugated outer conductor;
   (F) rotatable attachment means affixed to said particle trapping means in a disposition of electrical continuity therewith and having a rotatable portion thereof which is rotatable on a pivot support axis disposed parallel to the direction of travel of said inner conductor;
   (G) a lever arm fixedly disposed upon said rotatable portion for being angularly moved in correspondence with rotation of said rotatable portion;
   (H) a non-binding electrical contact piece disposed on said lever arm for making non-binding electrical contact with the inner surface of said corrugated outer conductor; and
   (I) biasing means for biasing said electrical contact piece against said inner surface of said corrugated outer conductor to maintain electrical continuity between said corrugated outer conductor and said particle trapping means regardless of the axial position of said particle trapping means relative to the corrugations of said corrugated outer conductor.

2. The gas-insulated transmission line of claim 1 wherein the electrical contact piece is a metal roller.

3. The gas-insulated transmission line of claim 1 wherein said lever arm is disposed parallel with the direction of said corrugations of said corrugated outer conductor.

* * * * *